United States Patent
Forlong

(10) Patent No.: US 6,753,495 B2
(45) Date of Patent: Jun. 22, 2004

(54) APPARATUS AND METHODS FOR CONTROL OF A MATERIAL PROCESSING DEVICE

(76) Inventor: Murray Forlong, 12 Fathom Place, Te Atatu Auckland (NZ)

(*) Notice: Subject to any disclaimer, the term of this patent is extended or adjusted under 35 U.S.C. 154(b) by 60 days.

(21) Appl. No.: 10/158,051

(22) Filed: May 31, 2002

(65) Prior Publication Data

US 2003/0000928 A1 Jan. 2, 2003

Related U.S. Application Data

(60) Provisional application No. 60/294,950, filed on May 31, 2001.

(51) Int. Cl.$^7$ .............................. B23K 9/00; H05B 1/00
(52) U.S. Cl. ........................... 219/121.39; 219/121.44; 373/18
(58) Field of Search ............................... 373/18, 21–25, 373/52, 94, 100; 219/121.11, 146.21, 75, 69.2, 69.14, 69.17, 121.18, 121.36, 121.39, 121.48, 121.56, 121.58; 75/10.19; 65/DIG. 4; 432/13; 414/187

(56) References Cited

U.S. PATENT DOCUMENTS

| | | | | |
|---|---|---|---|---|
| 3,422,206 A | * | 1/1969 | Baker et al. | 219/121.11 |
| 4,606,038 A | * | 8/1986 | Lugscheider et al. | 373/24 |
| 5,548,611 A | * | 8/1996 | Cusick et al. | 373/18 |
| 6,576,858 B1 | * | 6/2003 | Yokomichi | 219/69.2 |

* cited by examiner

Primary Examiner—Tu Ba Hoang
(74) Attorney, Agent, or Firm—Young & Thompson

(57) ABSTRACT

A multi-axis machine method and apparatus for the control of the motion of a material processing device is disclosed. The device has supply element and the apparatus has a supply co-ordination element. The motion of the processing device can be co-ordinated with the motion of the apparatus such that the loading or twisting forces on the supply element is substantially reduced. The supply co-ordination element includes an angle drive mechanism and rotator housing assembly. An angle drive mechanism for setting the angle of a processing device, the mechanism includes a linear actuator connected to a rod and the rod is pivotally connected at a first end to the actuator and connected at a second end to a device support, the actuator being connected to the rod such that movement of the actuator causes the rod to move the processing device relative to the device support, in the device support.

19 Claims, 14 Drawing Sheets

APPARATUS AND METHODS FOR CONTROL OF A MATERIAL PROCESSING DEVICE

The content of my co-pending U.S. patent application, filed on even date herewith, entitled "Methods and Apparatus for a Linear Guiding Device", is incorporated herein by reference in its entirety.

BACKGROUND OF THE INVENTION

This invention relates to apparatus and methods for control of a material processing or bevel device.

Automated multi-axis machines and the like can be used for processing workpieces. Typical processes that multi-axis machines can be used for, are cutting and welding workpieces. In one embodiment, workpieces can be cut by attaching a plasma arc torch to a multi-axis machine.

One problem with placing a plasma arc torch on a multi-axis machine is that supply lines (e.g., gas hoses and electrical cables) for the plasma arc torch, which supply shield gas and current to the torch, can become twisted or strained during operation of the multi-axis machine. Currently, when the torch is translated/rotated to a desired cutting position, the machine must retrace its movement so that the torch supply lines are unravelled as the torch is reset to its starting position. The twisting of torch supply lines limits their life.

One method to improve the life of the supply lines is to pass each component of the lines through a rotational device. For the cables which supply current to the torch, a slip ring can be used as a rotational device. For the hoses which supply gas to the torch, a mechanical seal type rotational device can be used. These devices, however, are costly to install and maintain and have limited useful lives.

SUMMARY OF THE INVENTION

It is therefore an object of the present invention to provide an improved apparatus and methods for control of a material processing device which will obviate or minimise the foregoing disadvantages in a simple yet effective manner or which will at least provide the public with a useful choice.

It has been discovered that when a material processing device such as a torch is mounted on a multi-axis machine, motion of the device can be coordinated with the motion of the multi-axis machine to reduce loading on the supply lines, resulting in longer service life. In addition, it has also been discovered that when the motion of the device is coordinated with the motion of the multi-axis machine, the angle of the cutting head can be set by using a unique angle drive mechanism which is not part of a conventional multi-axis machine.

Therefore the invention provides a multi-axis machine apparatus for the control of the motion of a material processing device. The device has supply means and the apparatus has a supply co-ordination means wherein the motion of the processing device can be co-ordinated with the motion of the apparatus such that the loading or twisting forces on the supply means is substantially reduced.

Preferably the supply co-ordination means includes an upper assembly and a lower assembly wherein the upper assembly includes an angle drive mechanism for controlling vertical angular rotation of the processing device and includes a rotator assembly for supporting the horizontal rotation of the processing device.

Preferably the lower assembly is provided with a device support which device is supported by an angular processing device support wherein the support provides a structure to enable the device to angularly move within.

Preferably the angle drive mechanism is located at an upper end of the upper assembly, the rotator housing assembly is connectively located below the angle drive mechanism and the angular device support is located at the lowest end of the lower assembly wherein the angle drive mechanism raises and lowers, the lower assembly in the vertical direction to set the angle of the processing device in the device support, and the rotator housing assembly independently supports the rotation of the processing device in a horizontal plane.

Preferably the angle drive mechanism includes a linear actuator and pivoting rod wherein the linear actuator is connected to an upper end of the pivoting rod and a lowe end of the pivoting rod is connected to the angular device support wherein movement of the linear actuator moves the rod which moves the device within the device support.

Preferably the linear actuator comprises a motor and rack and pinion mechanism which raises and lowers the lower assembly via the rack and pinion on a vertical hollow shaft assembly wherein the hollow shaft allows for the feeding of the supply means therein for a processing device located in the processing device support.

Preferably the co-ordination means includes a flexible drive system connectively located between the upper and lower assembly, for transferring the rotation from one end of the apparatus to the other wherein the flexible drive system comprises a flexible drive between a drive pinion and a driven pinion which engage a drive gear and a following driven gear respectively.

Preferably the rotator housing assembly includes a rotator motor and mounting plate.

Preferably the drive gear is supported and located at the lower end of the hollow shaft of the angle drive mechanism, at an upper end of the flexible drive and the drive gear is attached to a device support bearing located at the lower end of the flexible drive, the driven gear being connected to the flexible drive via the pinion wherein initiation of the rotator motor rotates the housing and the drive pinion which rotates the driven pinion by way of the flexible drive, the lower following gear rotates the processing device.

Preferably the flexible drive has a gear and pinion system at the upper end of the shaft and similarly for the lower end, wherein the lower assembly is able to move anywhere within the range of the drive shaft yet not allow the processing device to rotate therefore eliminating cable twist for the supply to the processing mechanism.

Preferably the processing device is a cutting mechanism.

Alternatively the processing device is a plasma arc mechanism.

Preferably the device support includes a curved track, wherein the track is rotatable horizontally by initiation of the rotator motor.

Preferably the track is a channel member.

Preferably the rotator housing mounting plate is connected to the device support and push rod.

Preferably when the angle drive mechanism operates, the rack and pinion mechanism moves vertically shifting the shaft and push rod to move the processing device in the channel.

Preferably the lower bearing forms a part of the mounting for the processing mechanism.

The invention also provides an angle drive mechanism for setting the angle of a processing device. The mechanism includes a linear actuator connected to a rod and the rod is pivotally connected at a first end to the actuator and connected at a second end to a device support, the actuator being connected to the rod such that movement of the actuator causes the rod to move the processing device relative to the device support, in the device support.

Preferably the linear actuator includes a motor and a rack and pinion assembly mounted on a first vertical shaft.

Preferably the device support is a curved track.

Preferably the rod is connected to a second vertical shaft wherein the rod is angled in orientation with respect to the second vertical shaft.

The invention provides a method for rotating a processing device mounted on a multi-axis apparatus, the method comprising the steps of:
a) providing a linear actuator;
b) providing a device support;
c) providing a connecting rod pivotally connected at a first end to the actuator and connected at a second end to the device support;
d) energising the actuator to linearly move the first end of the rod to angularly rotate the device in the device support.

The invention further provides a method for rotating a processing device mounted on a multi-axis machine. The device having supply means such that the supply means are not twisted or stressed, the method comprising the steps of:
1. providing a device support;
2. providing an angle drive mechanism wherein the angle drive mechanism includes a linear actuator, a connecting rod pivotally connected at a first end to the actuator and connected at a second end to the device support;
3. providing a rotator housing assembly, and the assembly includes a mounting plate, an actuator and flexible drive system wherein the flexible drive system comprises a flexible drive connected between a drive pinion and a driven pinion wherein the pinions engage a drive gear and a following gear respectively whereby the drive gear is connected to the angle drive mechanism and the following gear is connected to the processing device;
4. energising the angle drive linear actuator to linearly move the first end of the rod to angularly rotate the device in the device support, in the vertical axis;
5. energising the rotator housing actuator rotates the housing which rotates the device support in the horizontal axis.

To those skilled in the art to which the invention relates, many changes in construction and widely differing embodiments and applications of the invention will suggest themselves without departing from the scope of the invention as defined in the appended claims. The disclosures and the description herein are purely illustrative and are not intended to be in any sense limiting.

BRIEF DESCRIPTION OF THE DRAWINGS

The above and further advantages of this invention may be better understood by referring to the following description, taken in conjunction with the accompanying drawings, in which.

DESCRIPTION OF THE PREFERRED EMBODIMENTS

Figure 2:
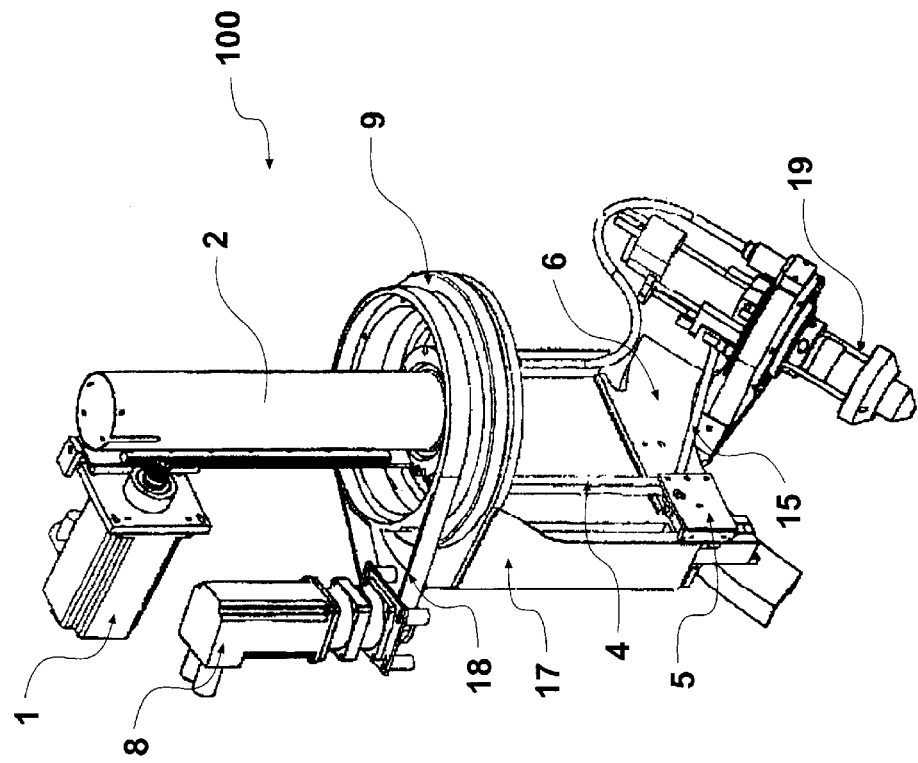
FIG. 2 is a perspective top front view of a portion of a multi-axis machine, an angle drive mechanism, a flexible drive system, and a cutting head, where the cutting head is at a 45 degree angle position.
Figure 1:
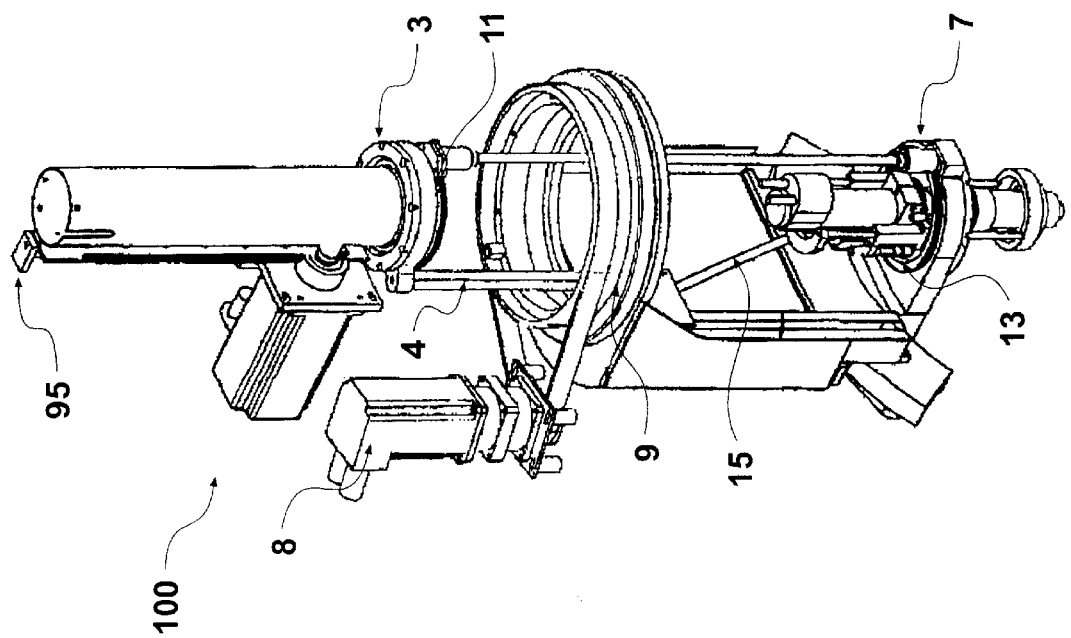
FIG. 1 is a perspective top front view of a portion of a multi-axis machine, an angle drive mechanism, a flexible drive system, and a cutting head, where the cutting head is in a vertical or zero degree angle position.
Figure 4:
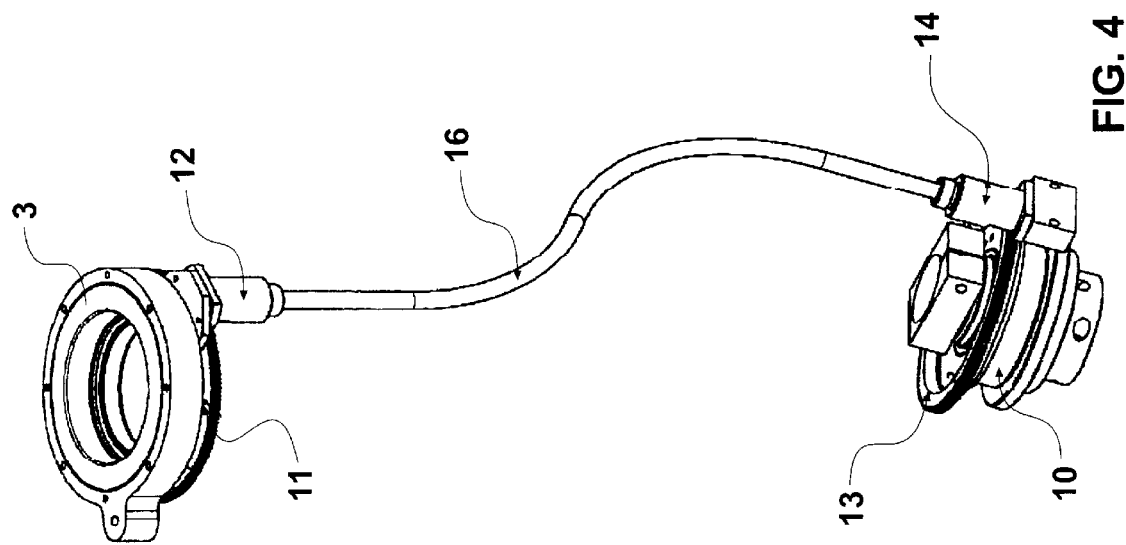
FIG. 4 is a perspective view of a flexible drive system for the cutting head.
Figure 3:
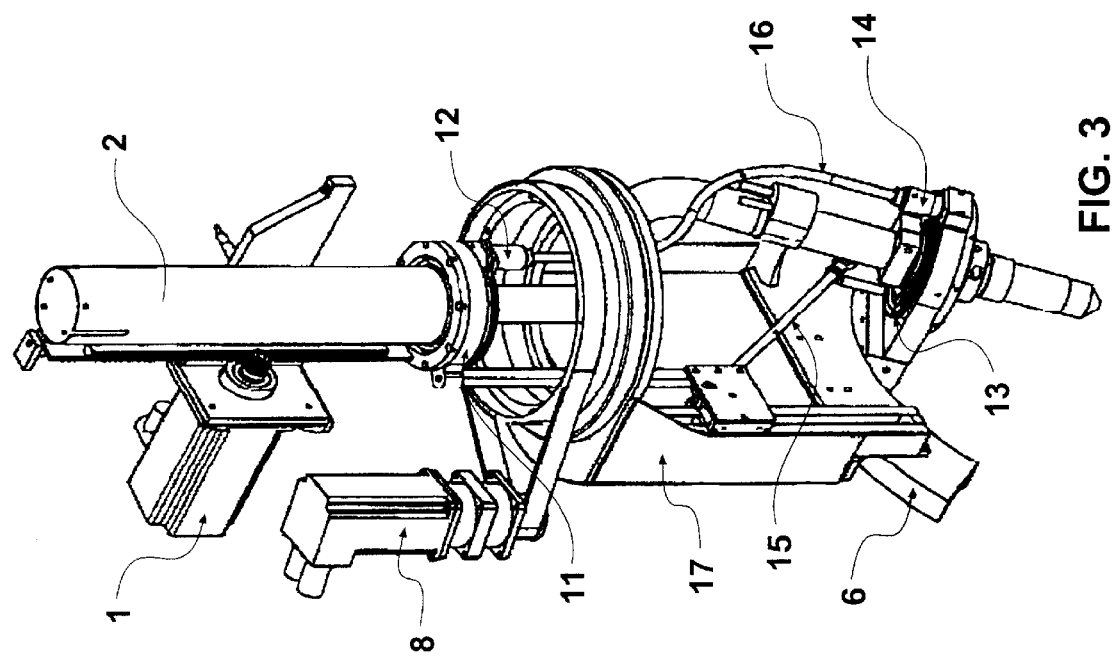
FIG. 3 is a perspective top front view of a portion of a multi-axis machine, an angle drive mechanism, a flexible drive system, and a cutting head, where the cutting head is at an intermediate 22.5 degree angle position.
Figure 6:
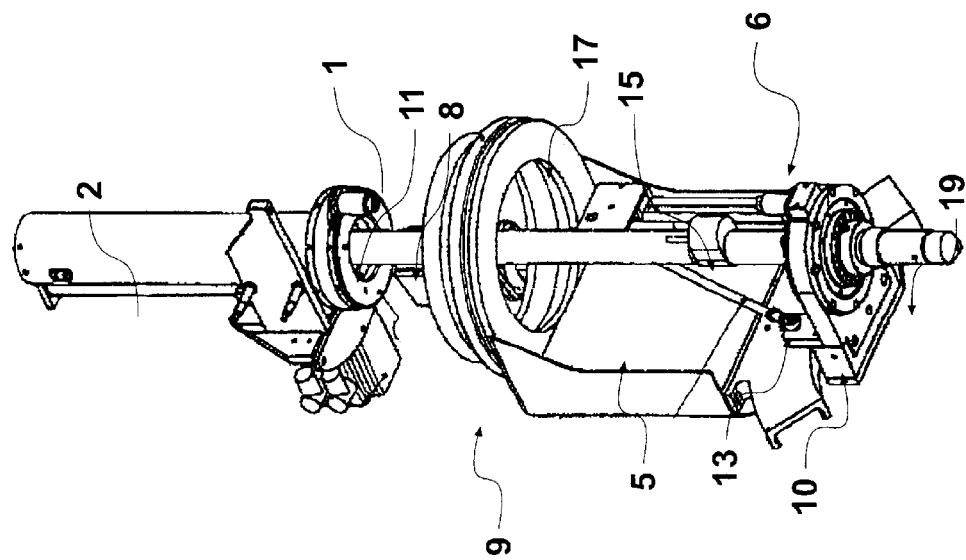
FIG. 6 is a perspective rear view of a portion of a multi-axis machine, an angle drive mechanism, supply lines, and a cutting head, where the cutting head is in a vertical or zero degree angle position but rotated horizontally through 90 degrees.
Figure 5:
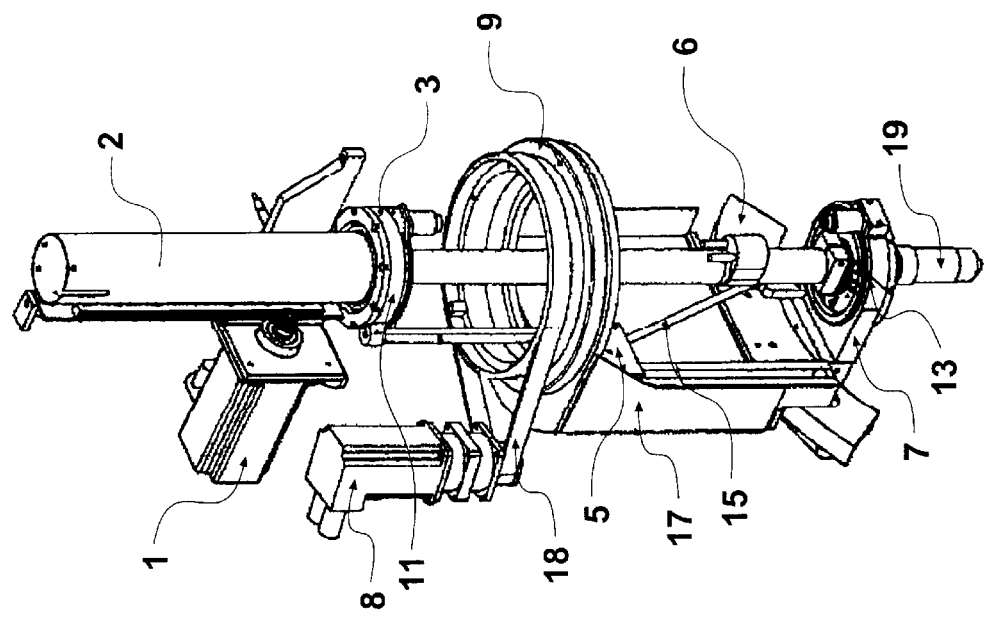
FIG. 5 is a perspective top front view of a portion of a multi-axis machine, an angle drive mechanism, supply lines, and a cutting head, where the cutting head is in a vertical or zero degree angle position.
Figure 8:
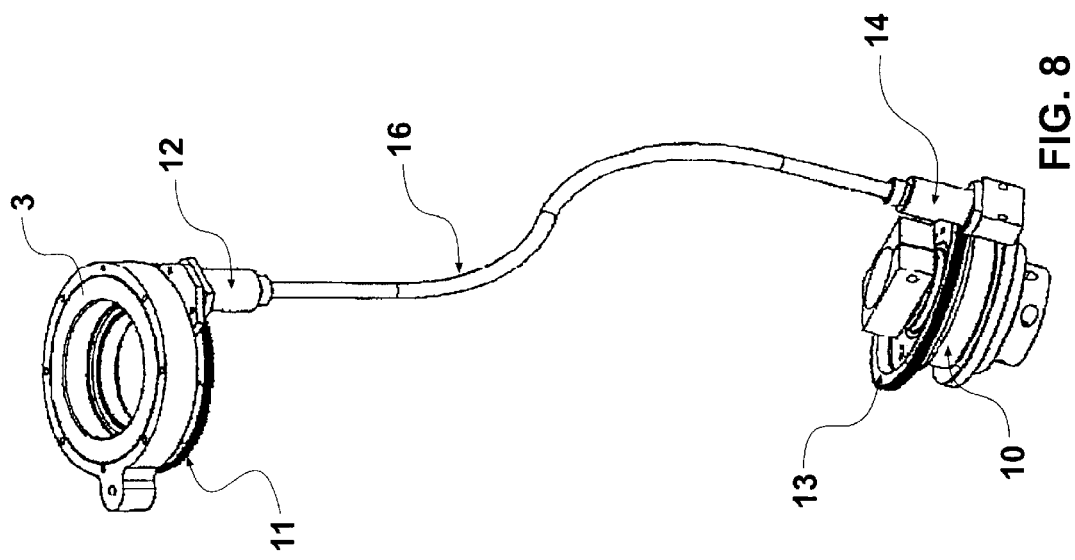
FIG. 8 is a perspective view of a flexible drive system for the cutting head.
Figure 7:
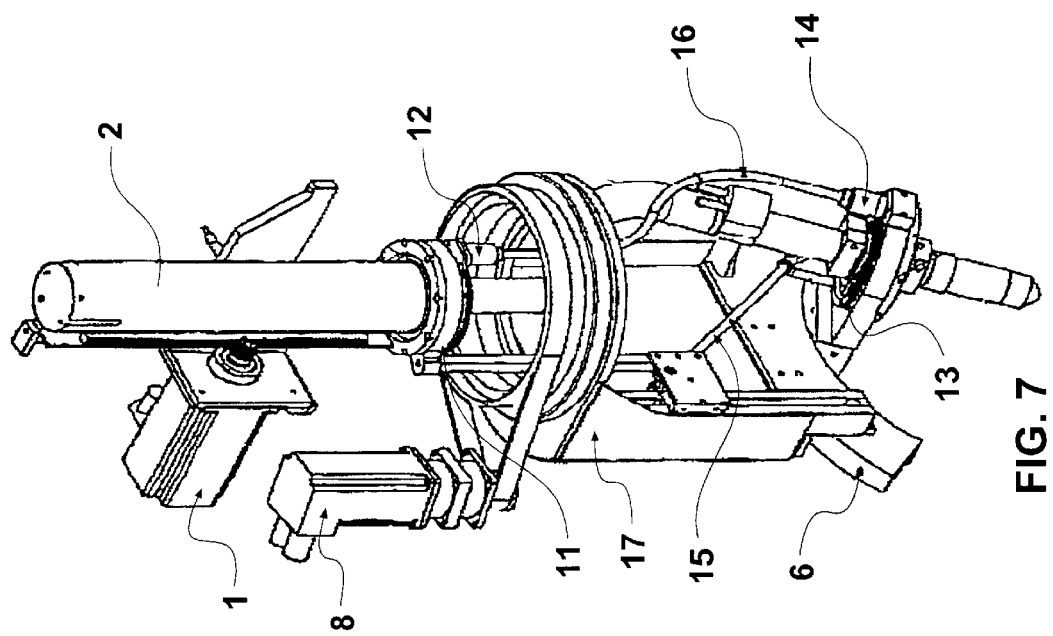
FIG. 7 is a perspective front view of a portion of a multi-axis machine, an angle drive mechanism, a flexible drive system, supply lines, and a cutting head, where the cutting head is at an intermediate 22.5 degree angle position with zero degree horizontal rotation.
Figure 11:
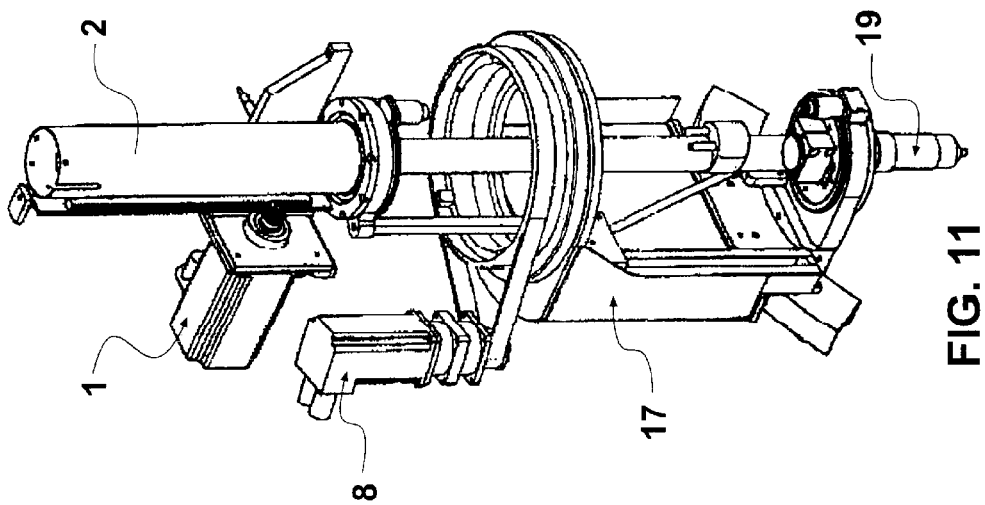
FIG. 11 is a perspective top front view of a portion of a multi-axis machine, an angle drive mechanism, supply lines, and a cutting head, where the cutting head is in a vertical or zero degree angle position.
Figure 10:
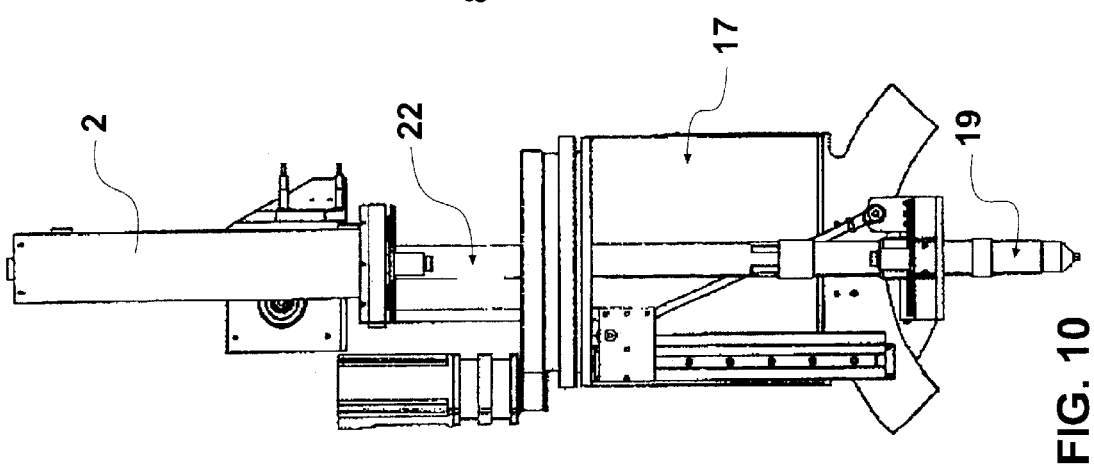
FIG. 10 is a front view of a portion of a multi-axis machine, an angle drive mechanism, supply lines, and a cutting head, where the cutting head is in a vertical or zero degree angle position.
Figure 9:
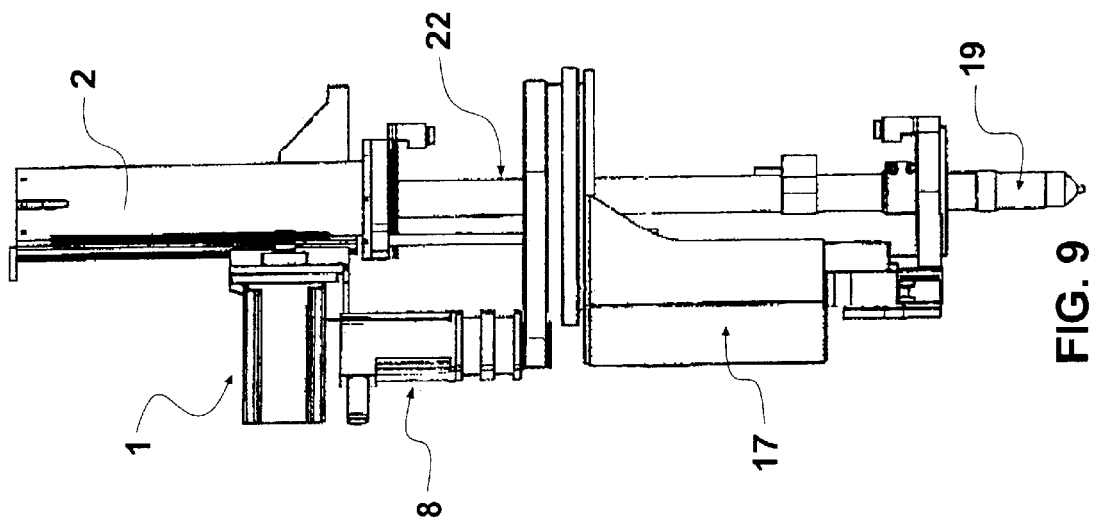
FIG. 9 is a side view of a portion of a multi-axis machine, an angle drive mechanism, supply lines, and a cutting head, where the cutting head is in a vertical or zero degree angle position.
Figure 14:
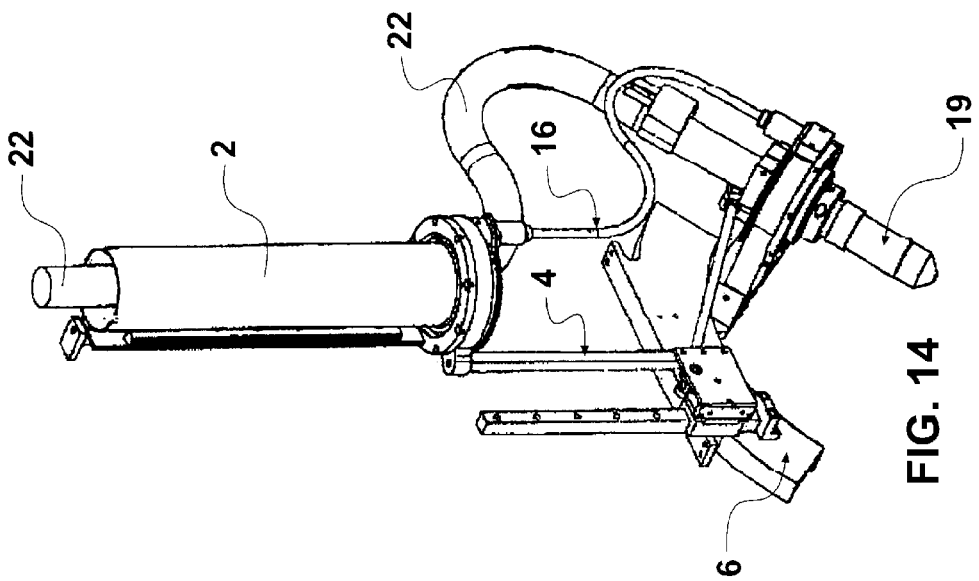
FIG. 14 is a perspective front view of, an angle drive mechanism, angle roller guide, slider, push rod, supply lines, and a cutting head, where the cutting head is in a 45 degree angle position with zero degree horizontal rotation.
Figure 13:
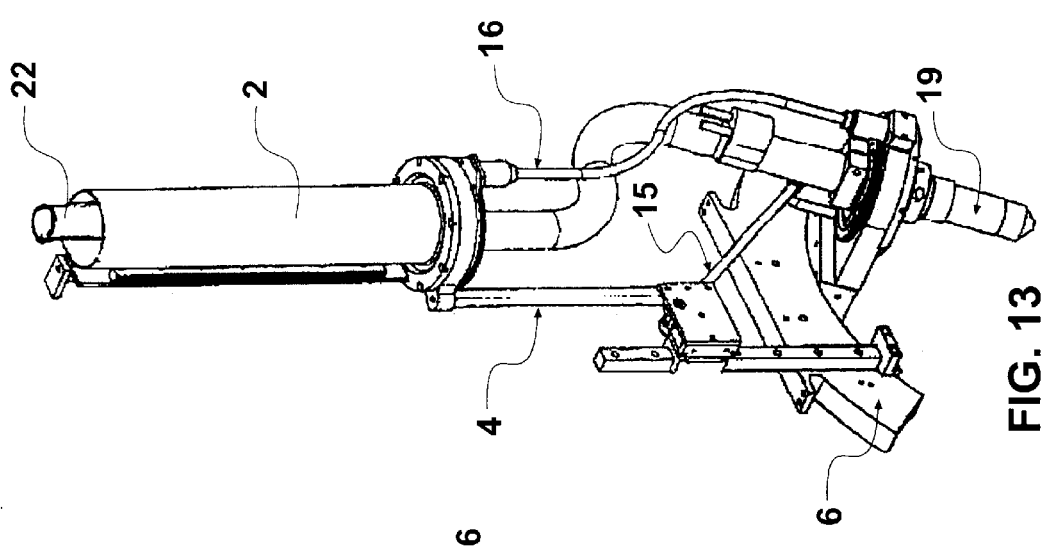
FIG. 13 is a perspective front view of, an angle drive mechanism, angle roller guide, slider, push rod, supply lines, and a cutting head, where the cutting head is in a 22.5 degree angle position with zero degree horizontal rotation.
Figure 12:
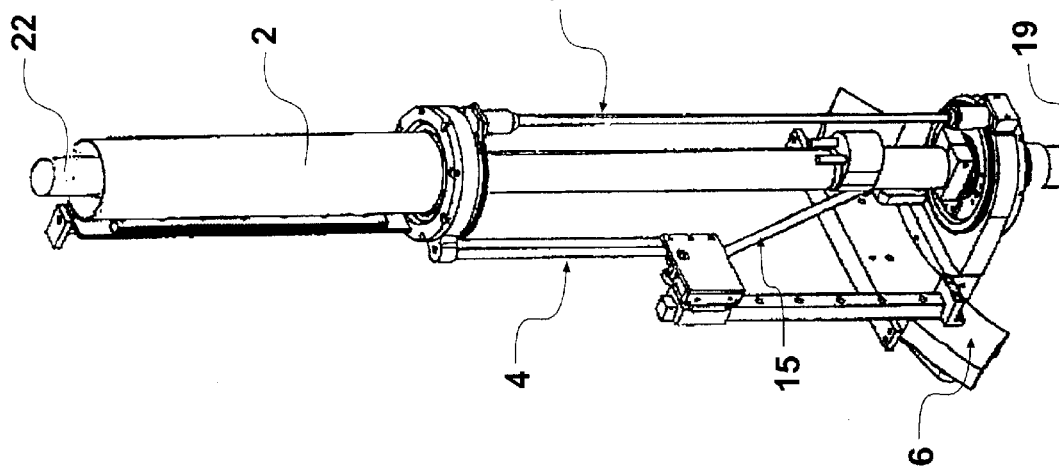
FIG. 12 is a front perspective view of, an angle drive mechanism, angle roller guide, slider, push rod, supply lines, and a cutting head, where the cutting head is in a vertical or zero degree angle position with zero degree horizontal rotation.
Figure 17:
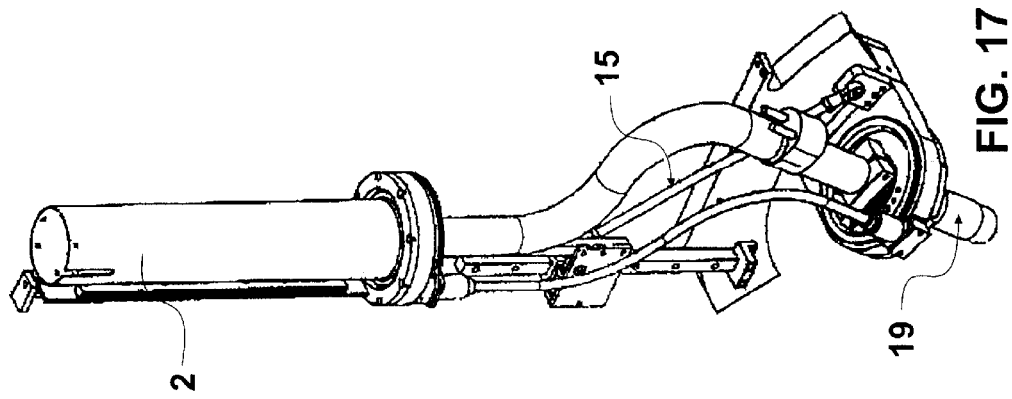
FIG. 17 is a perspective front view of, an angle drive mechanism, angle roller guide, slider, push rod, supply lines, and a cutting head, where the cutting head is in a 22.5 degree angle position and rotated 90 degrees.
Figure 16:
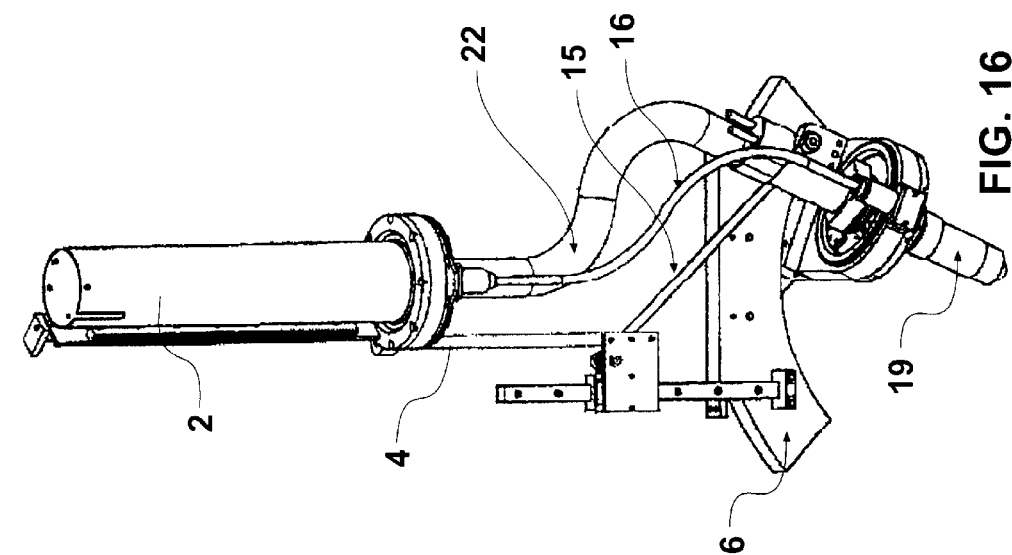
FIG. 16 is a perspective front view of, an angle drive mechanism, angle roller guide, slider, push rod, supply lines, and a cutting head, where the cutting head is in a 22.5 degree angle position and rotated 45 degrees.
Figure 15:
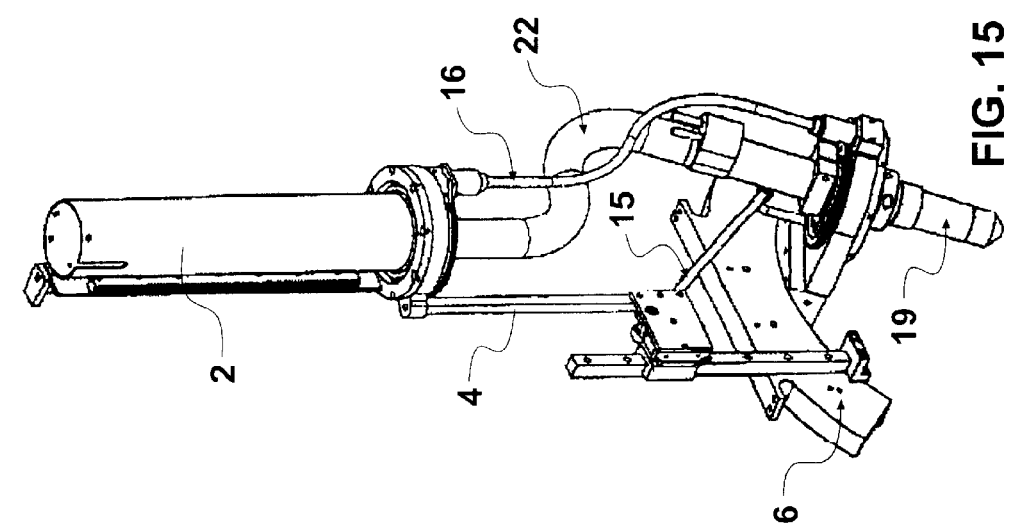
FIG. 15 is a perspective front view of, an angle drive mechanism, angle roller guide, slider, push rod, supply lines, and a cutting head, where the cutting head is in a 22.5 degree angle position and rotated 0 degrees.
Figure 20:
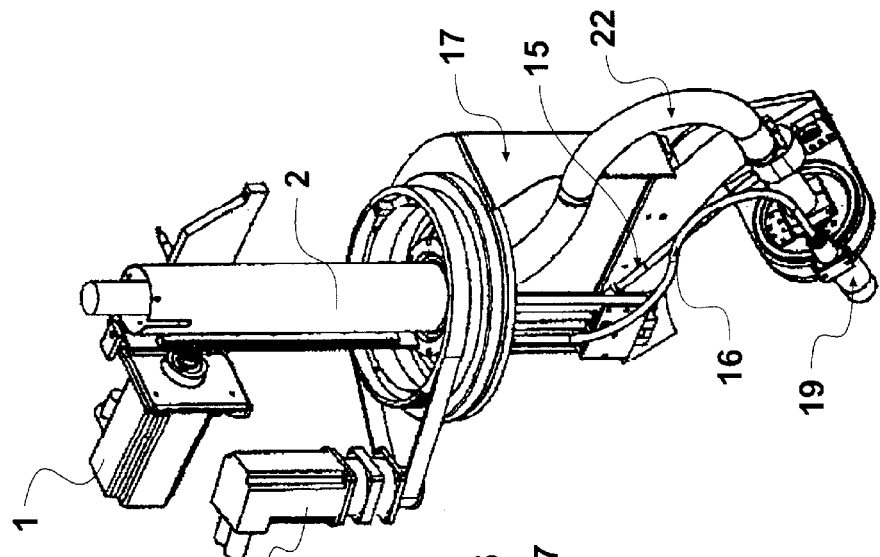
FIG. 20 is a perspective front view of, a portion of a multi-axis machine, an angle drive mechanism, angle roller guide, slider, push rod, supply lines, and a cutting head, where the cutting head is in a 90 degree angle rotation and a 45 degree bevel.
Figure 19:
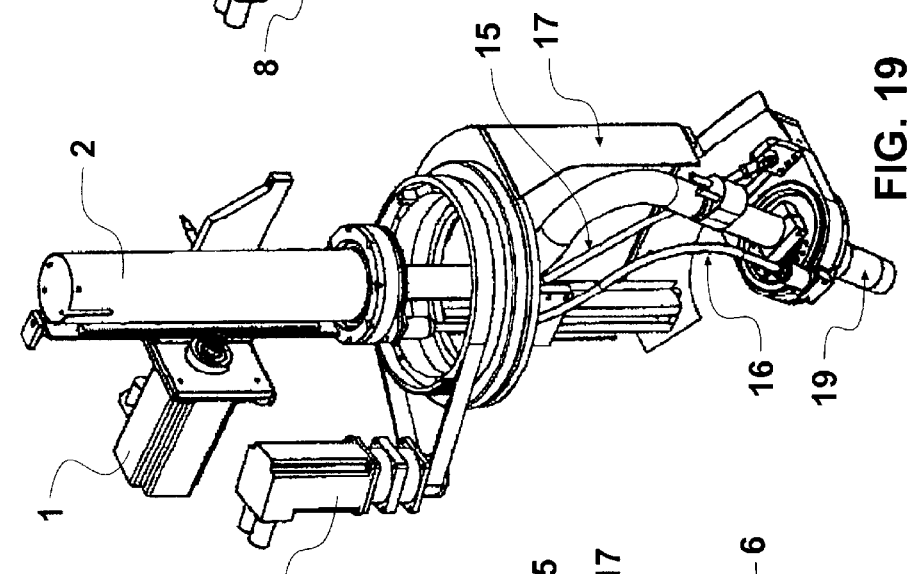
FIG. 19 is a perspective front view of, a portion of a multi-axis machine, an angle drive mechanism, angle roller guide, slider, push rod, supply lines, and a cutting head, where the cutting head is in a 90 degree angle rotation and a 22.5 degree bevel.
Figure 18:
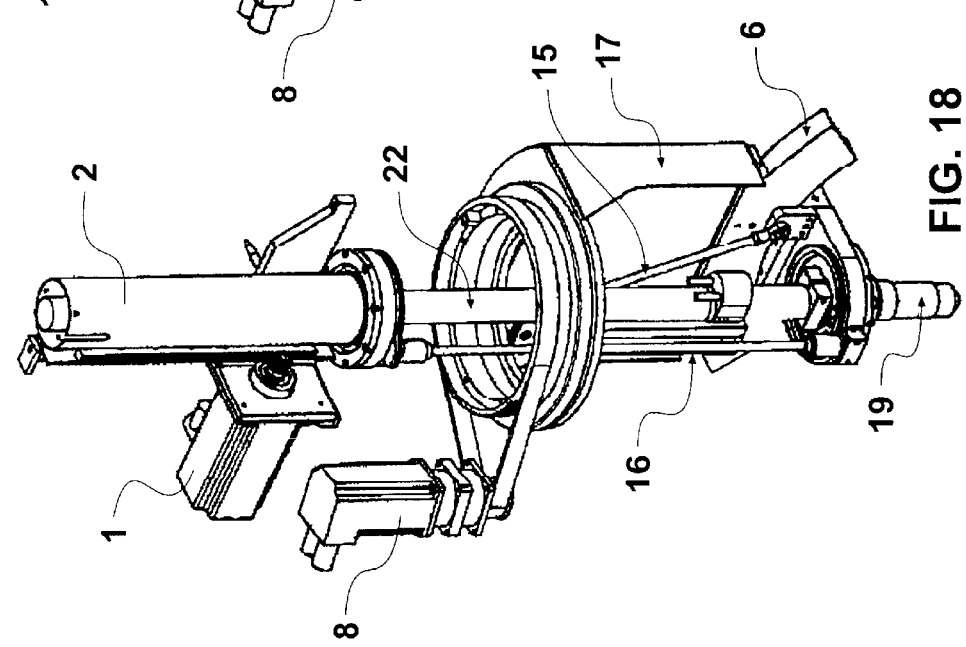
FIG. 18 is a perspective front view of, a portion of a multi-axis machine, an angle drive mechanism, angle roller guide, slider, push rod, supply lines, and a cutting head, where the cutting head is in a 90 degree angle rotation and a 0 degree bevel.
Figure 23:
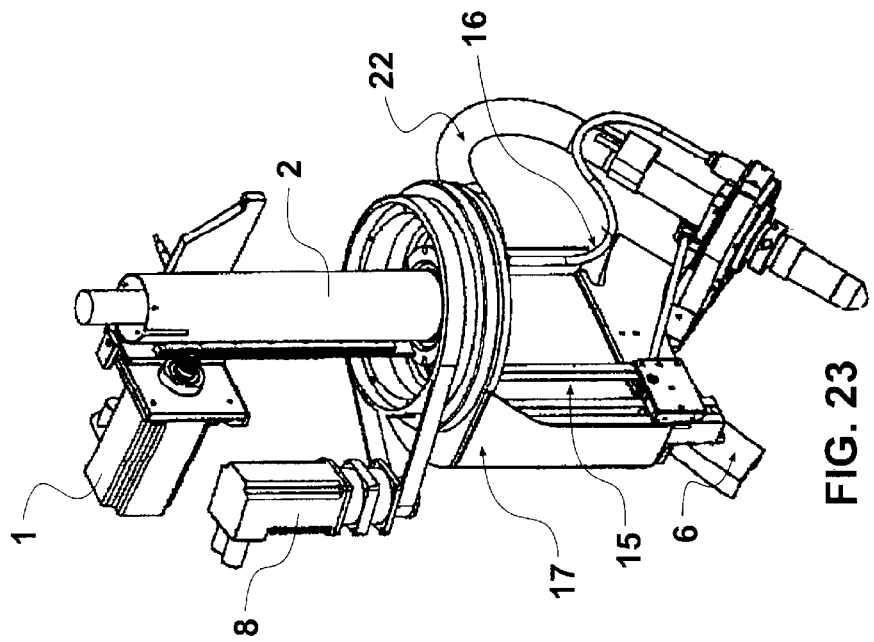
FIG. 23 is a perspective front view of, a portion of a multi-axis machine, an angle drive mechanism, angle roller guide, slider, push rod, supply lines, and a cutting head, where the cutting head is in a 0 degree angle rotation and a 45 degree bevel.
Figure 22:
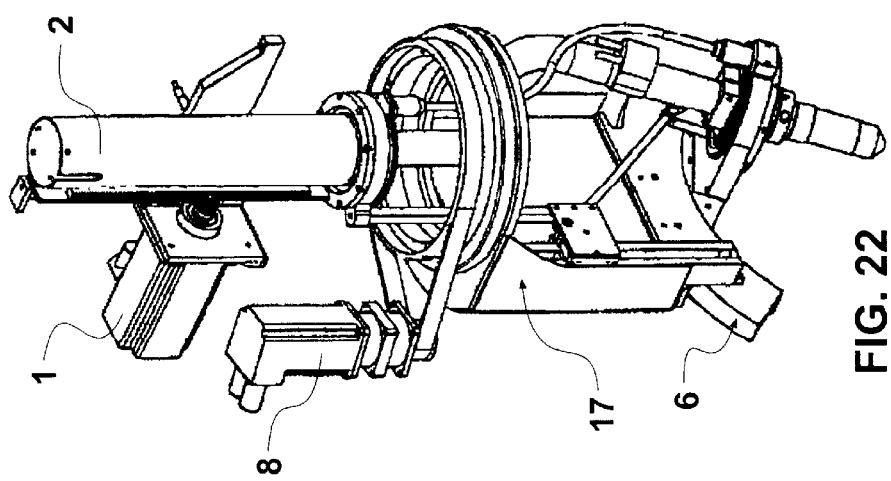
FIG. 22 is a perspective front view of, a portion of a multi-axis machine, an angle drive mechanism, angle roller guide, slider, push rod, supply lines, and a cutting head, where the cutting head is in a 0 degree angle rotation and a 22.5 degree bevel.
Figure 21:
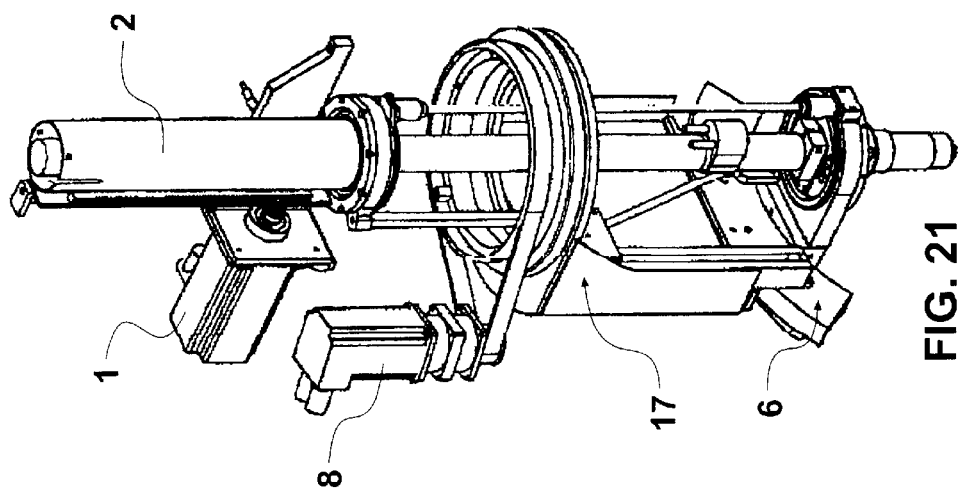
FIG. 21 is a perspective front view of, a portion of a multi-axis machine, an angle drive mechanism, angle roller guide, slider, push rod, supply lines, and a cutting head, where the cutting head is in a 0 degree angle rotation and a 0 degree bevel.
Figure 26:
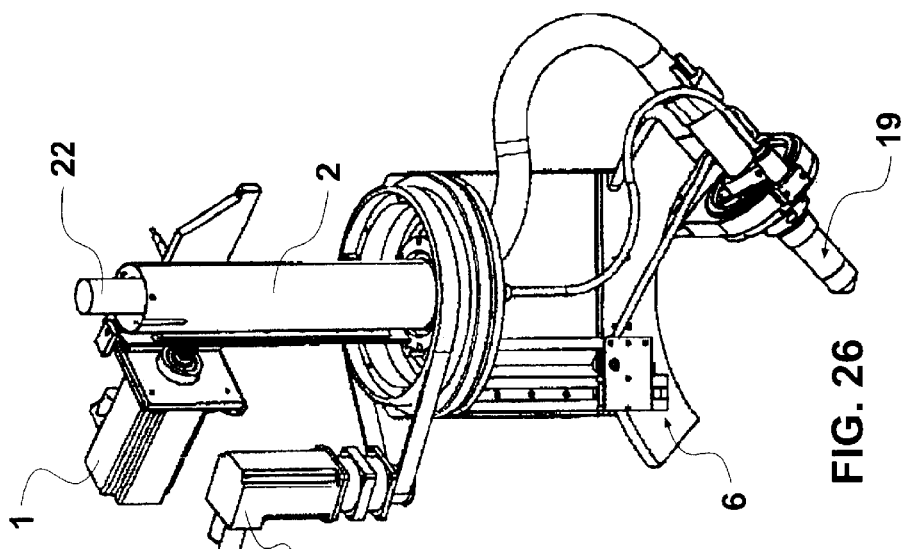
FIG. 26 is a perspective front view of, a portion of a multi-axis machine, an angle drive mechanism, angle roller guide, slider, push rod, supply lines, and a cutting head, where the cutting head is in a 45 degree angle rotation and a 45 degree bevel.
Figure 25:
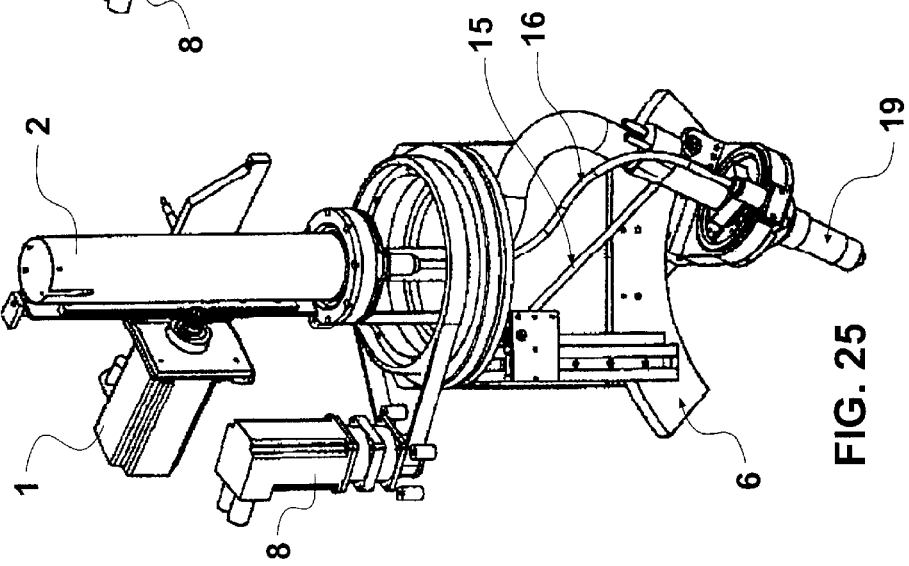
FIG. 25 is a perspective front view of, a portion of a multi-axis machine, an angle drive mechanism, angle roller guide, slider, push rod, supply lines, and a cutting head, where the cutting head is in a 45 degree angle rotation and a 22.5 degree bevel.
Figure 24:
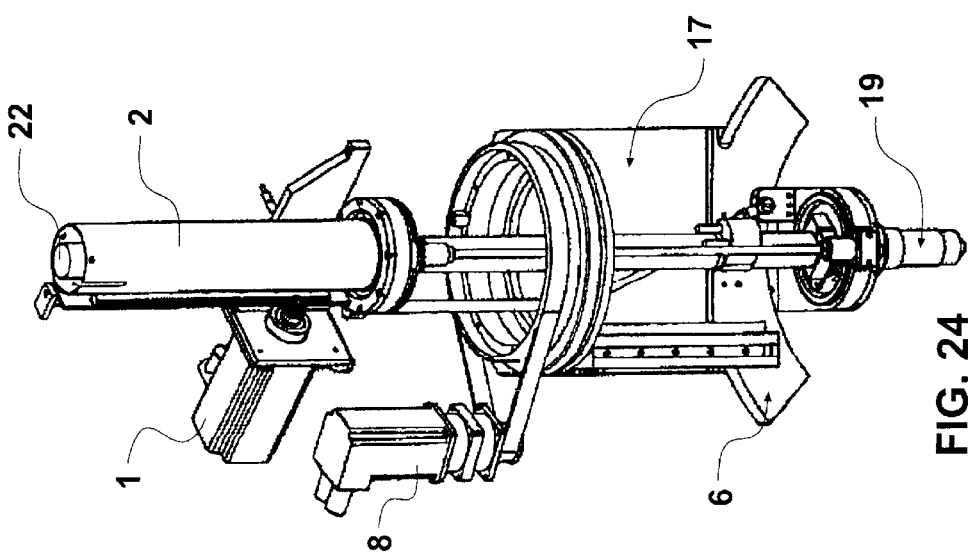
FIG. 24 is a perspective front view of, a portion of a multi-axis machine, an angle drive mechanism, angle roller guide, slider, push rod, supply lines, and a cutting head, where the cutting head is in a 45 degree angle rotation and a 0 degree bevel.
Figure 27:
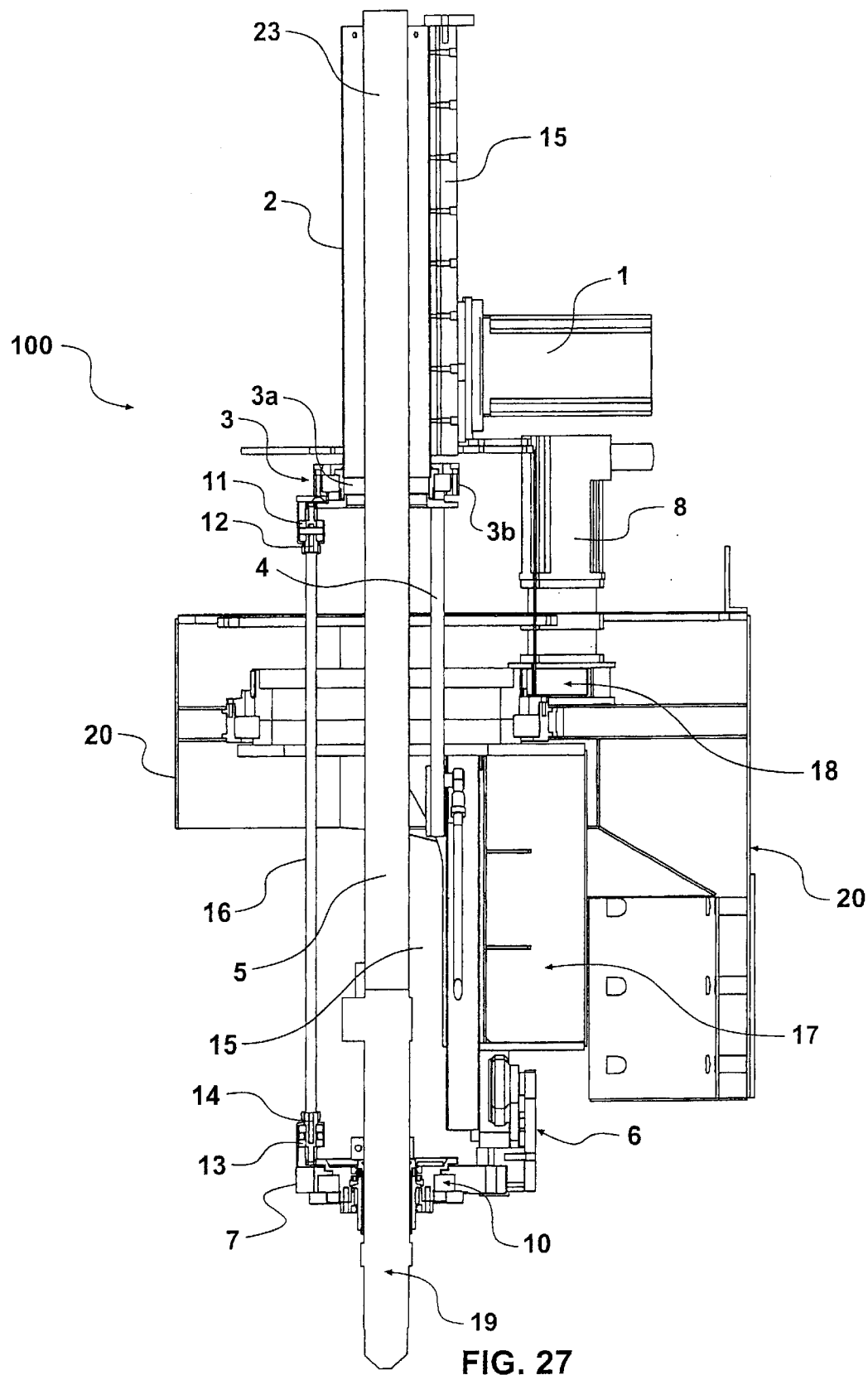
FIG. 27 is a cross-sectional view of, a portion of a multi-axis machine, an angle drive mechanism, angle roller guide, slider, push rod, supply lines, and a cutting head.
Figure 28:
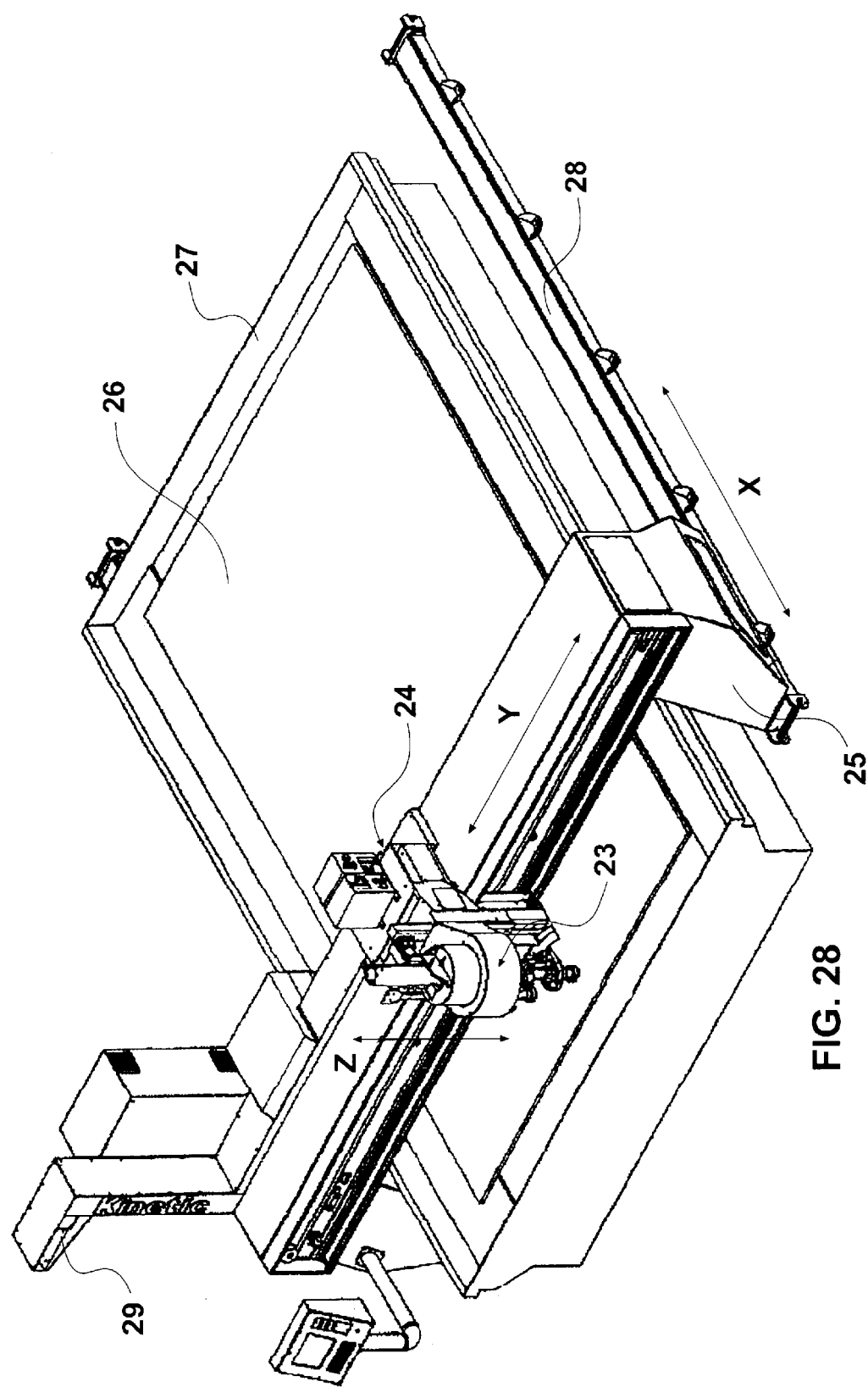
FIG. 28 is a perspective view of, a multi-axis machine, table, gantry, an angle drive mechanism, angle roller guide, slider, push rod, supply lines, a cutting head, and a workpiece.
Figure 29D:
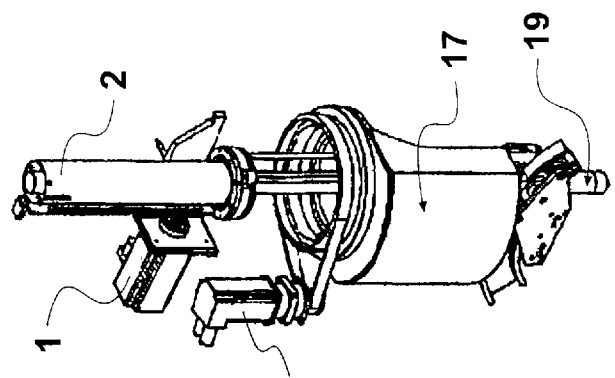
FIGS. 29A–29H are perspective views of a portion of a multi-axis machine, an angle drive mechanism, angle roller guide, slider, push rod, supply lines, and a cutting head, where the cutting head is at various angle position and various bevel angle positions.
Figure 29C:
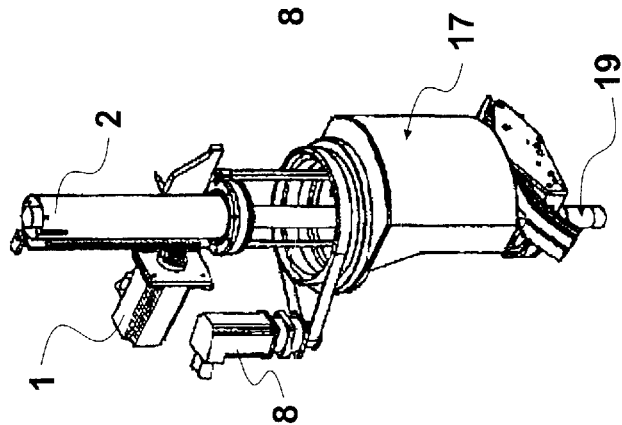
Figure 29B:
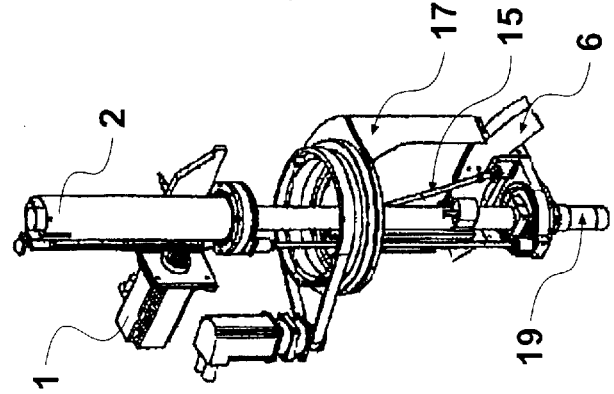
Figure 29A:
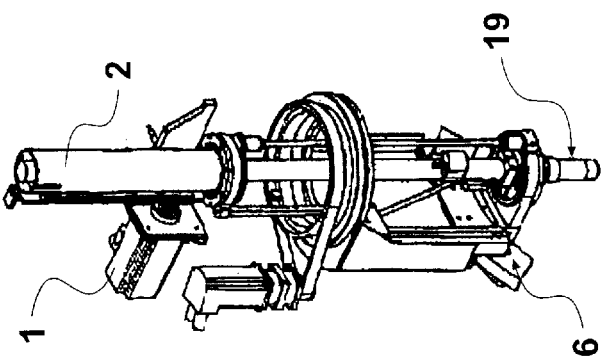
Figure 29H:
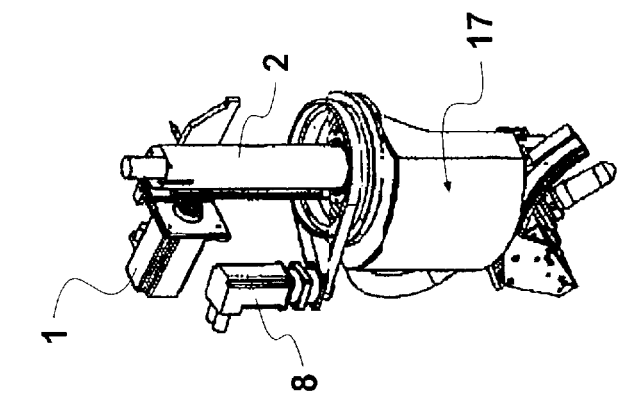
Figure 29G:
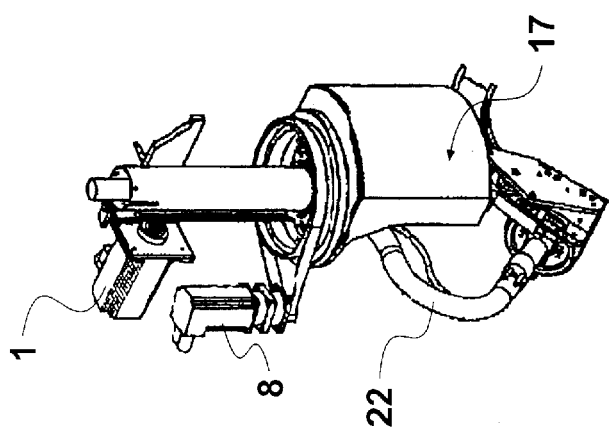
Figure 29F:
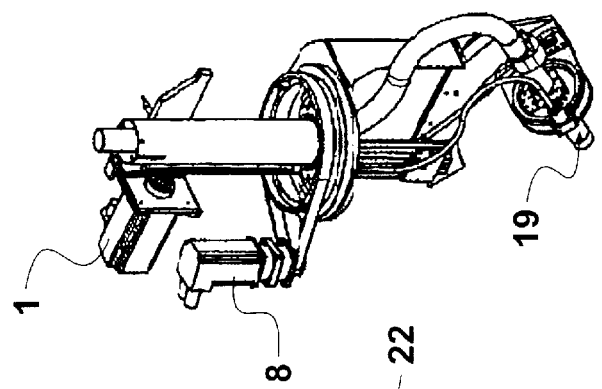
Figure 29E:
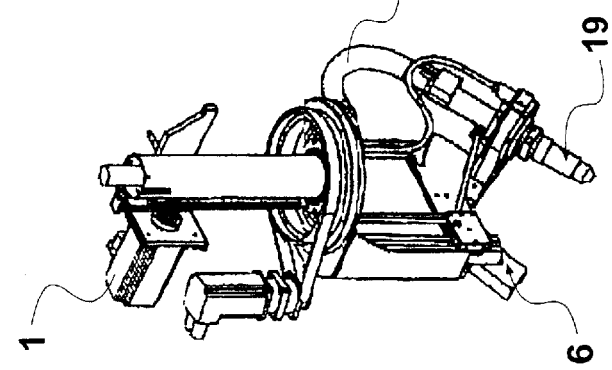

Referring to FIGS. 1–29, there is shown a device (100) which is one example or one embodiment of the invention. The device is used to control a cutting mechanism 19 when the cutting mechanism is mounted on a multi-axis machine. For ease of description a list of components of the device shown in the drawings follows:
1. Angle drive motor
2. Angle drive mechanism
3. Angle drive rotator bearing
4. Vertical output shaft
5. Output shaft slider
6. Angle roller guide
7. Cutting head mount plate
8. Rotator drive motor
9. Rotator drive Bearing
10. Cutting head mount bearing
11. Drive Gear
12. Flexible shaft drive pinion
13. Following Gear
14. Flexible shaft following pinion
15. Push Rod
16. Flexible Drive shaft
17. Rotator Housing
18. Rotator Drive Belt
19. Cutting Mechanism or torch
20. Linear guide
21. Rack and Pinion Drive
22. Supply lines The device 100 can be attached to a travelling head (23) which is attached to a further structure (24) slidably mounted on an overhead gantry structure (25) straddling a work piece (26) sitting on a cutting table (27). The gantry (25) can be moveable on a fixed base (28). A control mechanism (29) can be any known mechanism which enables programming of various operation and can also be used to control the various movements required.

Therefore the invention provides a device being a multi-axis machine apparatus for the control of the motion of a material processing device. The material processing device has supply means (23) and the apparatus has a supply co-ordination means wherein the motion of the processing device (19) can be coordinated with the motion of the apparatus such that the loading or twisting forces on the supply means (23) is substantially reduced.

The supply co-ordination means includes an upper assembly and a lower assembly wherein the upper assembly includes an angle drive mechanism (2) for controlling vertical angular rotation of the processing device and includes a rotator housing assembly (3), (8) & (17) (18) for supporting the horizontal rotation of the processing device.

A linear actuator for example an angle drive motor (1) is used to drive an angle drive mechanism (2) vertically via a rack and pinion drive (21). The angle drive mechanism (2) is constrained to move in the vertical direction by the use of a linear guide (20). Supply lines (22) to a cutting mechanism (19) pass through the angle drive mechanism (2).

An angle drive rotator bearing (3) is connected to the end of the angle drive mechanism (2). The angle drive mechanism (2) is connected to a first race or inner race (3a) of the angle drive rotator bearing (3). A vertical output shaft (4) is connected to a second race or outer race (3b) of the angle drive rotator bearing (3). The vertical output shaft (4) is constrained to a linear movement via a vertical output shaft guide slider (5). The vertical output shaft guide slider (5) is connected to a push rod (15) that in turn is connected to the cutting head mount plate (7). An actuator for example a motor (8) is used to drive the housing (17) rotationally.

The cutting head mount plate (7) and a cutting mechanism (19) are attached to an angle roller guide (6). The angle roller guide (6) is a curved track in which rollers are constrained. As the rollers are pushed along this track by the push rod (15), the cutting head mount plate (7) and cutting mechanism (19), which are connected to the rollers, are moved along the angle roller guide (6) to a desired angle, between about 0 degrees and 45 degrees in the embodiment shown.

The angle roller guide (6) can be made so that the center of rotation of the cutting mechanism is co-incident with the center of the rotating mechanism (19). This allows for the cutting mechanism (19) to angle over and rotate without the requirement for the machine X, Y, Z axis to move to maintain the same virtual point of intersection with the workpiece.

The rotator housing (17) of a multi-axis machine is mounted to a rotator drive bearing (9). The rotator drive bearing (9) allows the rotator motor (8) to drive the rotator housing (17) via the rotator drive belt (18) and rotate the cutting mechanism (19) to a desired rotational angle.

The angle drive motor (1) drives the angle drive mechanism (2) down, which causes the output shaft guide slider (5) to be driven down by the vertical output shaft (4). The motion of the output shaft guide slider (5) causes the push rod (15) to push the cutting head mount plate (7) and the cutting mechanism (19) along the angle roller guide (6). This allows the angle of the cutting mechanism (19) to be set independent of the rotational axis of the multi-axis machine.

It should be noted the angle of the cutting mechanism (19) relative to vertical has a relationship with the angular movement of the angle drive motor (1).

The rotator drive bearing (9) and the angle drive rotator bearing (3) ensure that the angle drive mechanism is able to move the cutting mechanism (19) to an angle independent of the rotation of the rotator housing (17) and the cutting mechanism (19) assemblies.

The distance the angle drive mechanism (2) moves downward provides the amount of additional length of supply cables and lines required, which in turn allow the cutting mechanism (19) to rotate over to the maximum angle required. This eliminates the need for supply lines to slide through the angle drive mechanism as the cutting mechanism (19) angles over. The supply lines can be fixed to the top of the angle drive mechanism (2).

The invention further includes a flexible drive to eliminate twisting of supply lines to the cutting mechanism (19), which in one embodiment can be a plasma arc torch. This drive system is used to provide protected delivery of the supply cables and services to the cutting mechanism (19). Elimination of twisting of the supply lines is achieved by keeping the cutting mechanism (19) and the machine frame, i.e. the rotator housing (17), in their relative positions, regardless of the cutting mechanisms (19) angle or rotation.

A drive gear (11) is mounted to a rotationally stationary item, namely angle drive mechanism (2). A pinion (12) mounted onto a first end of a flexible drive shaft (16) engages the drive gear (11). The second end of the flexible drive shaft (16) has a driven or following pinion (14) that engages a following gear (13). The cutting mechanism (19) is held in a cutting head mount bearing (10), where the inner bearing race holds both the cutting mechanism (19) and the following gear (13).

As the rotator housing (17), cuffing mechanism (19), and angle roller guide (6) rotate, driven by the rotator motor (8) via the rotator belt drive (18), the drive gear (11) is held stationary. As the flexible shaft (16) has pinions with the same number of teeth on both ends, the following gear (13) is also held rotationally stationary.

This assembly is therefore able to rotate continuously without the service leads being twisted or torsionally loaded. This enables services such as current and gas to be continuously supplied to the cutting mechanism (19) without the service lines being subject to detrimental torque. This also eliminates the requirement for the rotational drive to unwind, since the supply services are not twisted when the cutting mechanism is positioned.

Operatively the flexible drive works substantially using the following sequence of steps:

1. First the rotator motor 8 is initiated;
2. This rotates the rotator housing 17 supported by bearing 9;
3. This rotates the vertical output shaft 4 and cutting mech support 19 horizontally as they are all mounted on to the rotator housing 17.
4. This rotates the angle rotator bearing 3 "housing" (no number see FIG. 8) relative to the fixed upper drive gear 11 which causes the upper pinion 12 on the flexible shaft to rotate.
5. This in turn rotates the lower following pinion 14 via the flexible drive shaft 16 by a same amount which in turn counter-rotates the following gear 13 which holds the cutting mechanism horizontally rotationally static.
6. This rotationally static result is what eliminates any windup in the supply lines.
7. A change in the rotation direction simply reverses the counter-rotation direction leaving the supply lines free from windup Power requirements do not change the design, being subject solely to the acceptable bend radius for the service supply lines.

Other embodiments of the current invention would allow laser bevel cutting with the use of rotational mirror joints to eliminate the bending of the services supply lines.

In summary, the current invention allows a torch or other material processing device to be mounted in a bearing. Using the flexible drive eliminates the twisting of service cables to the material processing device. In addition, the angle drive mechanism of the current invention also controls the bending angle of the material processing device, the angle being infinitely adjustable within its full range of travel.

Throughout the description of this specification the word "comprise" and variations of that word, such as "comprising", are not intended to exclude other additives, components, integers or steps.

Advantage of the Invention

The coordination means and method has the following advantages:
1. Elimination of twisting of supply lines;
2. Rotation in several axes;
3. Rotation independently operable;
4. Flexible drive mechanism.

What is claimed is:

1. A multi-axis machine apparatus for controlling motions of a material processing device for cutting out shapes and profiles, the apparatus comprising:

a supply means to provide power and energy to the material processing device, the supply means comprising cabling;

a supply co-ordination means to coordinate said motions of the processing device with motions of the apparatus such that loading or twisting forces on the supply means are substantially reduced, wherein, the co-ordination means comprises an upper assembly, a lower assembly, and a flexible drive system connectively located between the upper and lower assemblies, the flexible drive system for transferring rotation from one end of the apparatus to the other, and the flexible drive system comprises a drive pinion, a driven pinion, and a flexible drive located between the drive pinion and the driven pinion which engage a drive gear and a following driven gear.

2. A multi-axis machine apparatus as claimed in claim 1, wherein, the upper assembly includes an angle drive mechanism for controlling vertical angular rotation of the processing device and includes a rotator assembly for supporting a horizontal rotation of the processing device.

3. A multi-axis machine apparatus as claimed in claim 2, wherein, the lower assembly is provided with a device support which device support is itself supported by an angular processing device support, and the device support provides a structure to enable the processing device to angularly move within.

4. A multi-axis machine apparatus as claimed in claim 3, wherein, the angle drive mechanism is located at an upper end of the upper assembly, a rotator housing assembly is connectively located below the angle drive mechanism, and the angular processing device support is located at the lowest end of the lower assembly, the angle drive mechanism raises and lowers the lower assembly in the vertical direction to set the angle of the processing device in the device support, and the rotator housing assembly independently supports the rotation of the processing device in a horizontal plane.

5. A multi-axis machine apparatus as claimed in claim 4, wherein, the angle drive mechanism includes a linear actuator and a pivoting rod, the linear actuator is connected to an upper end of the pivoting rod and a lower end of the pivoting rod is connected to the angular processing device support, and movement of the linear actuator moves the rod which moves the device within the device support.

6. A multi-axis machine apparatus as claimed in claim 5, wherein, the linear actuator comprises a motor and a rack and pinion mechanism which raises and lowers the lower assembly via the rack and pinion on a vertical hollow shaft assembly, and a hollow shaft of the vertical hollow shaft assembly allows for the feeding of the supply means therein for a processing device located in the processing device support.

7. A multi-access machine apparatus for controlling motion of a material processing device for cutting out shapes and profiles, comprising:

a supply means to provide power to operate the processing device, the supply means including supply cabling;

a supply co-ordination means to co-ordinate motion of the supply means with motion of the processing device to avoid loading and twisting forces on the supply means; and a cutting mechanism connected to the supply cabling, the co-ordination means allowing the supply cabling that connects to the cutting mechanism to be supplied in proportion to an additional length required as cutting mechanism angles change to create bevel cut profiles and also to allow the cutting mechanism to rotate to allow bevel and straight cutting around and within a profile or shape being cut, during movement of the cutting mechanism, the supply means being constrained from rotating and twisting, the supply co-ordination means comprising a flexible drive system connectively located between an upper assembly and a lower assembly, the flexible drive system comprising a flexible drive located between a drive pinion engaging a drive gear and a following driven gear, and the supply co-ordination means preventing rotation from one end of the apparatus to a second end of the apparatus.

8. A multi-axis machine apparatus as claimed in claim 1, wherein, the rotator housing assembly includes a rotator motor and mounting plate.

9. A multi-axis machine apparatus as claimed in claim 6, wherein, the drive gear is supported and located at the lower end of the hollow shaft of the angle drive mechanism, at an upper end of the flexible drive, and the drive gear is attached to a device support bearing located at the lower end of the flexible drive, the driven gear is connected to the flexible drive, initiation of the rotator motor rotates the rotator housing and the drive pinion which drive pinion rotates the driven pinion by way of the flexible drive, the driven pinion acting on the drive gear to rotate the processing device.

10. A multi-axis machine apparatus as claimed in claim 9, wherein, the flexible drive has a first gear and pinion system at an upper end of a drive shaft and a second gear and pinion system at a lower end of the drive shaft, the lower assembly is able to move anywhere within a range of the drive shaft yet not allow the processing device to rotate therefore eliminating cable twist for the supply means to the processing mechanism.

11. A multi-axis machine apparatus as claimed in claim 10, wherein, the device support includes a curved track, wherein the track is rotatable horizontally by initiation of the rotator motor.

12. A multi-axis machine apparatus as claimed in claim 11, wherein, the track is a channel member.

13. A multi-axis machine apparatus as claimed in claim 12, wherein, the rotator housing assembly mounting plate is connected to the device support and push rod.

14. A multi-axis machine apparatus as claimed in claim 13, wherein, when the angle drive mechanism operates, the rack and pinion mechanism moves vertically shifting the shaft and push rod to move the processing device in the channel.

15. A multi-axis machine apparatus as claimed in claim 14, wherein, the drive gear forms a part of a mounting for the processing device.

16. A multi-axis machine apparatus as claimed in claim 15, wherein, the processing device is a cutting mechanism.

17. A multi-axis machine apparatus as claimed in claim 15, wherein, the processing device is a plasma arc mechanism.

18. A method for rotating a processing device mounted on a multi-axis machine, the device having supply means such that the supply means are not twisted or stressed, the method comprising the steps of:

a) providing a device support;

b) providing an angle drive mechanism wherein the angle drive mechanism includes an angle drive linear actuator, a connecting rod pivotally connected at a first end to the angle drive linear actuator and connected at a second end to the device support;

c) providing a rotator housing assembly, and the rotator housing assembly including a mounting plate, an actuator and flexible drive system, wherein the flexible drive system comprises a flexible drive connected between a drive pinion and a driven pinion, wherein the pinions engage a drive gear and a following gear respectively whereby the drive gear is connected to the angle drive mechanism and the following gear is connected to the processing device;

d) energizing the angle drive linear actuator to linearly move the first end of the rod to angularly rotate the device in the device support, in the vertical axis;

e) energizing the rotator housing assembly actuator to rotate the housing which rotates the device support in the horizontal axis.

19. A multi-axis machine apparatus, comprising:

a device support for supporting a device;

an angle drive mechanism comprising an angle drive linear actuator, a connecting rod pivotally connected at a first end to the angle drive linear actuator and connected at a second end to the device support; and a rotator housing assembly comprising a mounting plate, an actuator, and a flexible drive system, the flexible drive system comprising a flexible drive connected between a drive pinion and a driven pinion, the drive and driven pinions engaging a drive gear and a following gear respectively wherein the drive gear is connected to the angle drive mechanism and the following gear is connected to the processing device, wherein, the angle drive linear actuator moves linearly the first end of the rod to angularly rotate the device in the device support, in the vertical axis, and the rotator housing assembly actuator rotates to rotate the housing which rotates the device support in the horizontal axis.

* * * * *